United States Patent [19]

Kobayashi et al.

[11] Patent Number: 4,663,983

[45] Date of Patent: May 12, 1987

[54] TORQUE VARIATION ABSORBING DEVICE

[75] Inventors: Kiyonori Kobayashi, Chiryu; Masakazu Kamiya, Toyoake; Satoshi Kato, Anjo, all of Japan

[73] Assignees: Aisin Seiki Kabushiki Kaisha; Toyota Jidosha Kabushiki Kaisha, both of Aichi, Japan

[21] Appl. No.: 755,900

[22] Filed: Jul. 17, 1985

[30] Foreign Application Priority Data

Jul. 19, 1984 [JP] Japan .................. 59-108291[U]
Jul. 19, 1984 [JP] Japan .................. 59-108292[U]
Jul. 19, 1984 [JP] Japan .................. 59-108293[U]

[51] Int. Cl.⁴ .................. F16F 15/12; F16D 3/66; F16D 7/02
[52] U.S. Cl. .................. 74/574; 192/106.2; 464/46; 464/68
[58] Field of Search .......... 74/574; 192/106.2, 30 V; 464/10, 46, 68; 188/379, 380

[56] References Cited

U.S. PATENT DOCUMENTS

| | | | |
|---|---|---|---|
| 1,505,480 | 8/1924 | Manville | 464/48 |
| 2,042,570 | 6/1936 | Wemp | 74/574 X |
| 2,437,537 | 3/1948 | Kelleher | 464/68 |
| 2,729,079 | 1/1956 | Kuehn | 464/46 |
| 4,274,524 | 6/1981 | Nakane | 192/48.3 |
| 4,351,168 | 9/1982 | Prince et al. | 464/68 X |
| 4,445,876 | 5/1984 | Entrup | 464/46 X |
| 4,468,207 | 8/1984 | Yoshida | 464/66 |

FOREIGN PATENT DOCUMENTS

| | | | |
|---|---|---|---|
| 800698 | 7/1936 | France | 74/574 |
| 55-20930 | 2/1980 | Japan . | |
| 55-20964 | 2/1980 | Japan . | |
| 56-43176 | 10/1981 | Japan . | |
| 143821 | 11/1981 | Japan | 192/106.2 |

Primary Examiner—Rodney H. Bonck
Attorney, Agent, or Firm—Burns, Doane, Swecker & Mathis

[57] ABSTRACT

The torque variation absorbing device comprises a driving plate, a flywheel, and a spring mechanism, a damping and torque limiting mechanism and a hysteresis mechanism installed between the driving plate and the flywheel. The flywheel is divided into a flywheel body and a driven plate which are connected together by a bolt screwed into a bolt hole in the flywheel body and the driven plate. The bolt hole provided in the driven plate extends through the driven plate up to a sliding friction plane between the hysteresis mechanism and the driven plate. The dust generated by the friction of the hysteresis mechanism can be collected into the bolt hole.

16 Claims, 8 Drawing Figures

FIG. 7
PRIOR ART
FIG. 8
PRIOR ART
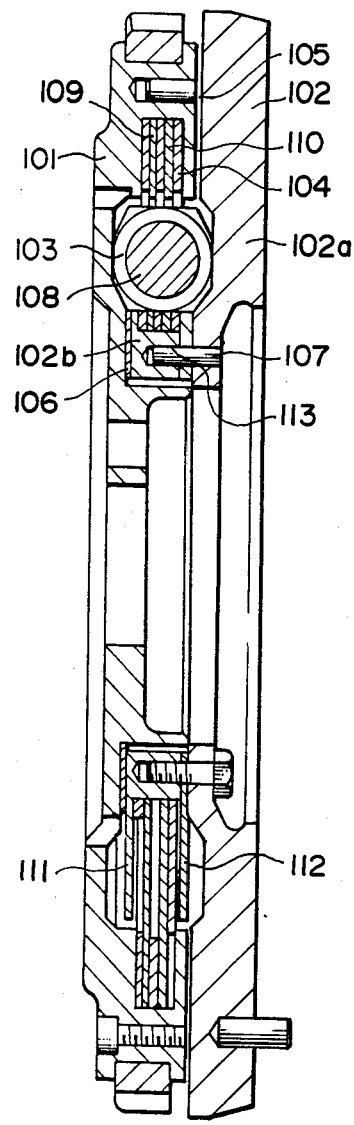
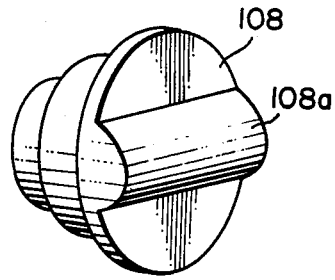

TORQUE VARIATION ABSORBING DEVICE

BACKGROUND OF THE INVENTION

1. Field of the invention:

The present invention relates to a torque variation absorbing device for an engine.

2. Description of the prior art:

An engine for an automobile or an aircraft is equipped with a torque variation absorbing device for power transmission.

The prior art offers such a torque variation absorbing device as disclosed, for instance, in Japanese patent publications Nos. SHO 55-20930, SHO 55-20964 and SHO 56-43176. Referring to FIG. 7, a device of the prior art has two inertia members, i.e., a driving plate 101 which is connected to a crankshaft of an engine and a flywheel 102 which is connected to the follower means and is rotatable with respect to the driving plate. Between the driving plate 101 and the flywheel 102, a spring mechanism 103 and a damping and torque limiting mechanism 104 are installed. In this device the rotation of the crankshaft is transmitted to the flywheel 102 through the driving plate 101, the spring mechanism 103 and the damping and torque limiting mechanism 104. Thus the torque variation is absorbed by the vibration system of these members. A gap 105 is provided between the driving plate 101 and the flywheel 102.

Flywheel 102 is divided into the flywheel body 102a and the driven plate 102b in order to house the damping and torque limiting mechanism. The flywheel body 102a and the driven plate 102b are fastened together by a fastening bolt 107 which is screwed into a bolt hole 113. The bolt hole 113 provided in the driven plate 102b is a blind one. In other words, the bolt hole 113 does not penetrate the driven plate 102b and does not reach the frictional member 106. The frictional member 106, slidably compressed with a certain force between the driven plate 102b of the flywheel 102 and the driving plate 101, develops a frictional force when it acts.

In the conventional device, however, the abraded dust generated when the frictional member 106 gets worn, remains on the frictional surface without being removed, with the result that the frictional force developed is unstable and sometimes excessive.

A friction generating mechanism of a conventional torque variation absorbing device consists of a frictional member 106 of phenol resin or asbestos interposed between iron pieces and when a load is imposed, the mechanism generates a dry frictional resistance.

The frictional member of asbestos has a high coefficient of friction and can generate an ample frictional resistance but lacks in anti-wear property and is likely to have large fluctuations in the coefficient of friction when it is abraded. Also, the frictional member of phenol resin has a low coefficient of friction with small variations in the value under abrasion, but it is likely to get worn and lacks in durability.

Moreover, the conventional spring seat 108 is formed such that both the contact portion for contacting the driving member (flat members 109, 110) and the contact portion for contacting the driven member (driven plates 111, 112) possess an identical shape having a semi-circular projection 108a, but when a vehicle runs, the projection 108a in contact with the driven member (driven plates 111, 112) of the spring seat 108 wears so heavily that a spring 103 comes into direct contact with the peripheral member, thereby destabilizing the hysteresis torque, and the torque variations cannot be well absorbed.

Conceivably these problems will be reduced (a) when the driven plate is fabricated thicker or (b) when the semi-circular part of the spring seat is elongated in the circumferential direction. However, other problems such as increase of an axial dimension in the case of (a) and decreased strength of the driven plate in the case of (b) will occur.

OBJECTS AND SUMMARY OF THE INVENTION

A primary object of the present invention is to reduce these problems by offering a torque variation absorbing device in which any abraded dust developed in the dry frictional resistance generating mechanism can be well absorbed.

Another object of the present invention is to offer a torque variation absorbing device equipped with a frictional member which has a high coefficient of friction to improve the vibration absorbing effect, which has a good anti-wear property to ensure a long life and which suffers little change in the coefficient of friction with progress of wear, thereby stabilizing the performance of the device.

Still another object of the present invention is to reduce wear of a spring seat, thereby stabilizing performance characteristics.

To accomplish these objects, the torque variation absorbing device of the present invention provides inertia masses comprising a driving plate coupled to the driving shaft and a flywheel coaxially and rotatably supported on the driving plate.

Between the driving plate and the flywheel there are interposed a spring mechanism, a damping and torque limiting mechanism and a hysteresis mechanism.

The flywheel is divided into a flywheel body and a driven plate. A bolt hole bored in the driven plate into which a bolt is screwed for fastening together the flywheel body and the driven plate extends up to a position of sliding friction between the hysteresis mechanism and the driven plate.

The frictional member of the hysteresis mechanism between the flywheel and the hysteresis mechanism is fabricated of abrasive material mainly constructed of polyimide resin.

Meanwhile, a projection is formed on the part of the spring seat which is opposed to and is able to contact the driving plate and a recess is formed on the part of the spring seat which is opposed to and is able to contact the driven disk. Desirably, a rib is formed on the spring seat between the projection and the recess.

In the torque variation absorbing device thus constituted, any abraded dust developed through sliding between the hysteresis mechanism and the driven plate of the flywheel will be removed into the bolt hole which opens against the sliding surface and will not remain at the sliding surface, thereby stabilizing the sliding friction and maintaining good performance.

Because the frictional member, mainly constituted of polyimide resin, of the hysteresis mechanism has a high coefficient of friction, small change of characteristic and stable performance, the amount of wear of the frictional member is small, enhancing the working characteristic and durability of the device.

Moreover, because the shape of the part of the spring seat which is opposed to the driven disk is formed approximately like a semi-circular recess, the contact area of it with the projection of the driven disk is increased, with the result that the pressure of the plane subjected to a centrifugal force due to rotation can be reduced and the wear of the spring seat can be reduced. Further, because the driving side of the spring seat is shaped convex at a position of the coil spring diameter and the driven side of it is formed concave at a position inside of the coil diameter of the coil spring, the coil spring can be made longer with an enlarged gap against the driven disk and accordingly the relative angular displacement between the driving side and the driven side can be increased, with the result that the natural frequency of the torque variation absorbing device can be decreased and the vibration absorbing effect can be increased. Besides, a rib formed at both sides of the recess on the spring seat will prevent the projection of the driven disk from moving and disengaging from the spring seat in the axial direction of the flywheel.

BRIEF DESCRIPTION OF THE DRAWINGS

These and other objects and advantages of the present invention will become more apparent and more radily appreciated from the following detailed description of the preferred exemplary embodiments of the present invention taken in conjunction with the accompanying drawings, wherein:

FIG. 7 is a sectional view of a conventional torque variation absorbing device; and FIG. 8 is an oblique view of the spring seat in the device of FIG. 7.

DETAILED DESCRIPTION OF THE PREFERRED EMBODIMENTS

A torque variation absorbing device constructed in accordance with a preferred embodiment of the present invention will be described with reference to the drawings.

Figure 1:
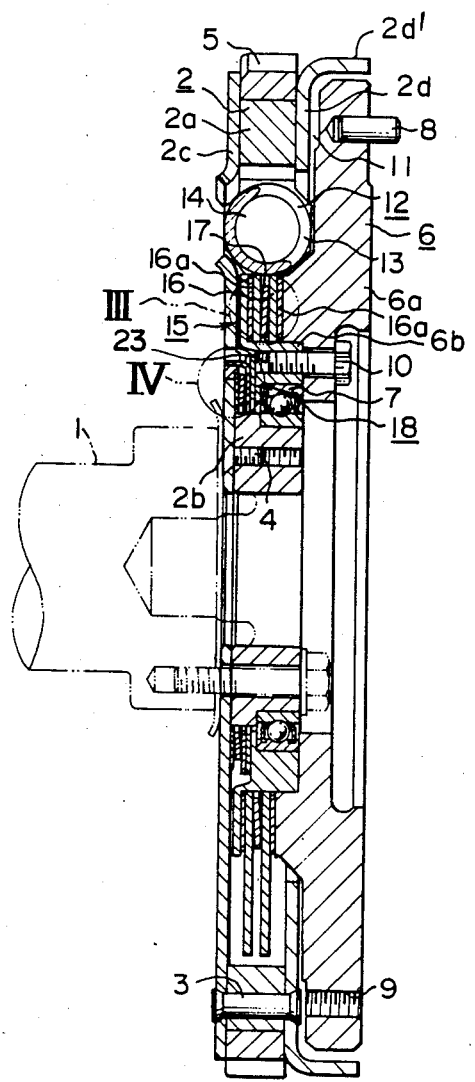
FIG. 1 is a sectional view taken along I—I in FIG. 2 of a torque variation absorbing device constructed in accordance with a preferred embodiment of the present invention.
Figure 4:
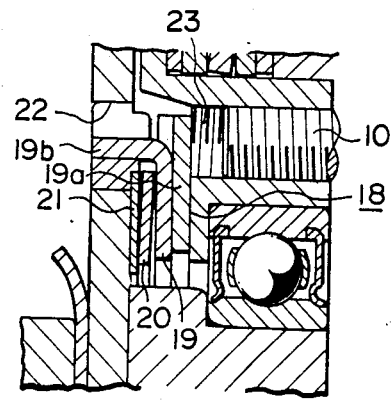
FIG. 4 is a partial sectional view of a part IV of the device of FIG. 1.

In FIGS. 1 and 4, a driving plate 2 is connected to a driving shaft of an engine crankshaft 1, and the driving plate 2 and the driving shaft 1 rotate together. The driving plate 2 comprises an outer body 2a shaped like a ring, an inner body 2b shaped like a ring, and steel side plates 2c and 2d which clamp the bodies 2a and 2b from both sides by a rivet 3 and a screw 4. On the periphery of the body 2a is press-fitted or shrink-fitted a ring gear 5 for accommodating the starting of an engine.

The side plate 2d which constitutes one part of the driving plate 2 and which is located close to the flywheel 6 has its periphery bent in the L-letter fashion to surround the flywheel 6. The bent portion 2d' covers a gap 11 extending straight in the radial direction between the driving plate 2 and the flywheel 6.

Parallel to the driving plate 2 and coaxial with the driving plate 2, the flywheel 6 is installed rotatably with respect to the driving plate 2 and it is supported rotatably by the driving plate 2 by means of the bearing 7. A clutch-positioning pin 8 is provided for positioning a clutch not shown and a screw hole 9 is formed for fitting the clutch cover not shown. The flywheel 6 is divided into a flywheel body 6a and a driven plate 6b so that it can house a damping and torque limiting mechanism 15 which will be described later. The flywheel body 6a and the driven plate 6b are connected together by means of a bolt 10.

The bolt hole 23 into which the bolt 10 goes extends through the driven plate 6b, extends to the plane where the hysteresis mechanism 18 slides against the driven plate 6b, and opens to the part where the hysteresis mechanism 18 is located. The part of the bolt hole 23 extending to the sliding plane may be either female screwed or, not female screwed.

A spring mechanism 12 (vibration supression mechanism by a spring) is provided between the driving plate 2 and the flywheel 6. The spring mechanism 12 comprises a plurality of coil springs 13 extending in the circumferential direction and spring seats 14 provided at both ends of each of the coil springs 13. The spring seats 14 are deformable with a greater spring constant than the spring 13. The spring seats 14 at both ends of the coil spring 13 are identical in shape, but one of the spring seats 14 provided at both ends of each spring 13 is opposed to radially inward projection of the outer body 2a of the driving plate 2 so as to contact the outer body 2a, while another of the spring seats 14 is opposed to a radially outward projection 16b of a driven disk 16 of the damping and torque limiting mechanism 15 which will be described later so as to contact the driven disk 16.

Figure 2:
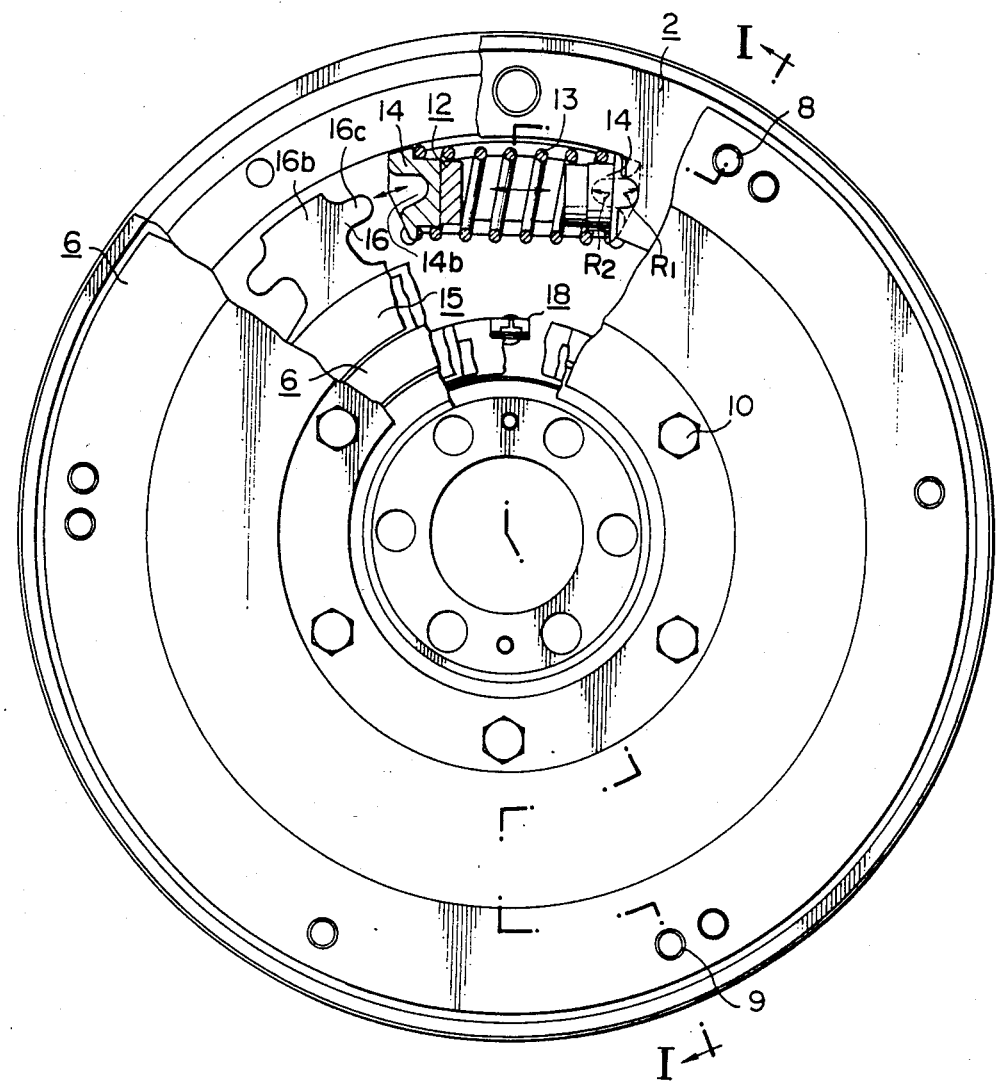
FIG. 2 is a partially sectional elevation view showing internal mechanisms of the device in FIG. 1.
Figure 6:
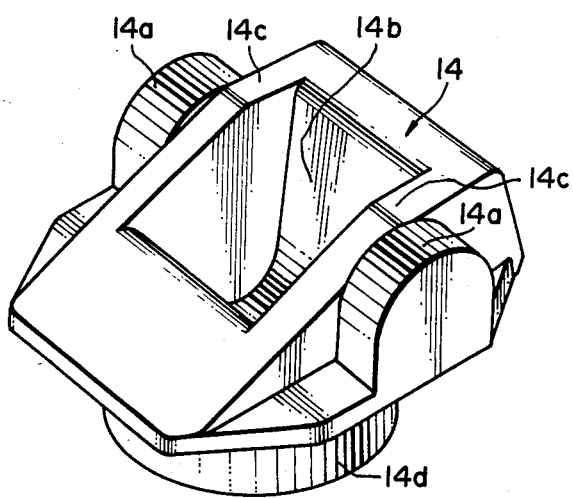
FIG. 6 is an oblique view showing the detail of the spring seat in the device of FIG. 1.

FIG. 6 is a detailed view of the spring seat 14. As seen from FIG. 6, the part of the spring seat 14 which is located approximately at the coil diameter of the spring and contacts the driving plate, has a projection 14a formed so as to project against the driving plate 2, while the part of the spring seat which contacts a projection 16c of the driven disk 16b and is located inside of the coil diameter of the coil spring 13, has a recess 14b formed to engage the projection 16c. The center $R_2$ of the semi-circular section of the recess 14b of the spring seat 14 at one end of the coil spring 13 is located nearer to the spring seat 14 at the other end of the coil spring 13 than the center $R_1$ of the semi-circular section of the projection 14a of the spring seat 14 at said one end of the coil spring 13 as shown in FIG. 2.

Between the projection 14a and the recess 14b there is formed a rib 14c, which constitutes a side wall of the recess 14b. On the opposite side of the recess 14b a projection 14d is formed on the spring seat 14 and the projection looks approximately like a short column. A pair of spring seats 14 are arranged at both ends of the spring 13, with their projections 14d facing each other, serving as the seat of the spring 13.

Figure 5:
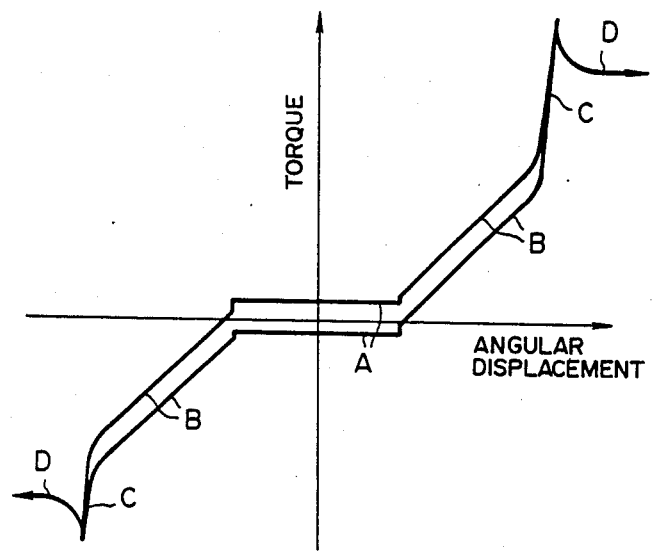
FIG. 5 is a diagram showing the torque transmission characteristic of the device of FIG. 1.

When no torque is acting, there is a gap between at least one of the spring seats 14 and at least one of the members 2a and 16b which the seat 14 is able to contact, thereby producing a torque-free characteristic A of FIG. 5. The characteristic A, however, has hysteresis on account of the hysteresis mechanism 18 which will be described later. The characteristic B in FIG. 5 is produced on account of a deformation of the spring 13 and the characteristic C is produced on account of a deformation of the spring seat 14 when the spring 13 is compressed to make the two spring seats 14 contact each other.

Figure 3:
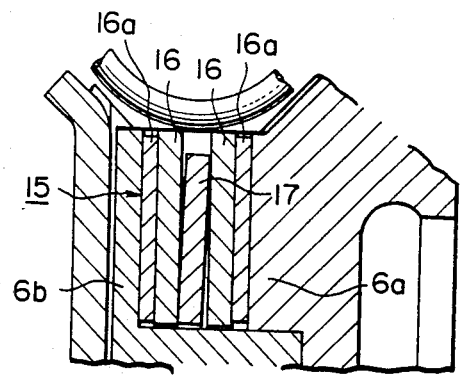
FIG. 3 is a partial sectional view of a part III of the device of FIG. 1.

As seen from FIG. 1, the damping and torque limiting mechanism 15 is located radially inside of the spring mechanism 12. As shown in FIG. 3, the damping and torque limiting mechanism 15, which is carried by the flywheel 6, comprises a pair of driven disks 16, 16 and a cone spring 17 installed between the disks 16, 16 and pressing the disks 16, 16 against the flywheel body 6a and the driven plate 6b. On the surfaces of the sides of the driven disks 16, 16 which contact the flywheel body 6a and the driven plate 6b are provided linings 16a, 16a of abrasive material. Vibrations due to torque variations can be damped by a sliding friction loss between the linings 16a and the fly wheel body 6a and the driven plate 6b. The thrust force of the driven disk 16 against the flywheel body 6a and the driven plate 6b depends upon the cone spring 17. When the torque is less than the frictional force which depends on this thrust force, the driven disk 16 and the flywheel 6 rotate together. When the torque exceeds the frictional force, relative slip takes place between the driven disk 16 and the flywheel 6, thereby releasing the portion of torque in excess of the frictional force. The characteristic D in FIG. 5 indicates the state that the torque in excess of the frictional force is released during such transmission.

The hysteresis mechanism 18 is located further radially inside of the torque limiting mechanism 15 and between the driving plate 2 and the flywheel 6. FIG. 4 illustrates the hysteresis mechanism 18. As seen from FIG. 4, in the hysteresis mechanism 18, a hysteresis plate 19 provided with a lining 19a of abrasive material is partially bent and a bent portion 19b is fitted into a hole 22 bored in the side plate 2c of the driving plate 2, thereby fixing circumferentially the hysteresis plate 19 to the driving plate 2. A cone spring 20 is installed between the hysteresis plate 19 and the side plate 2c, thereby pressing the lining 19a of the plate hysteresis 19 against the flywheel 6. The sliding friction between the lining 19a and the flywheel 6 produces a hysteresis as illustrated in FIG. 5.

Next, the action of the above-mentioned device of the present invention will be described referring to FIGS. 5 and 6. The rotating torque of the engine crankshaft 1 is transmitted to the driving plate 2 which rotates together with the crankshaft 1, and then to the flywheel 6 via the spring mechanism 12, the damping and torque limiting mechanism 15 and the hysteresis mechanism 18. Thereby a small variation of the torque of the crankshaft 1 and the engine vibration can be absorbed by a vibration system which comprises the spring mechanism 12, the damping and torque limiting mechanism 15, the hystersis mechanism 18 and the inertia members, i.e., the driving plate 2 and the flywheel 6.

As illustrated by the characteristics A, B, C, and D of FIG. 5, for the purpose of effectively absorbing the vibrations in an idling state of an engine, a soft spring characteristic is required when the relative rotational displacement between the driving plate 2 and the flywheel 6 is small and a hard spring characteristic is required for the purpose of making the spring mechanism 13 compact when the relative rotational displacement is large. Further, when a torque larger than required acts, it is necessary for the purpose of protecting the power train to limit the torque and transmit it to the clutch.

For these purposes, when the torque is small, the gap between the spring seat 14 and the driven disk 16 and the low frictional force of the hysteresis mechanism 18 effectively act to produce the characteristic A. Next, when the spring seat 14 and the driven disk 16 come into contact, the spring 13 deforms under an increased torque, producing the characteristic B. When with a further increase of the torque the spring 13 deforms more largely to cause two spring seats 14 to contact each other, the spring seats 14 themselves deform under the increased torque, producing the characteristic C. When the torque increases and exceeds a specified torque, a slip develops between the damping and torque limiting mechanism 15 and the flywheel 6, thereby releasing an excess of the torque and producing the characteristic D. In this way, the torque can be transmitted to the power train with its variations effectively absorbed.

To produce these characteristics consistently, the abraded dust generated in the internal mechanisms, that is, the damping and torque limiting mechanism 15 and the hysteresis mechanism 18 of the torque variation absorbing device, should be removed swiftly from the sliding friction surface. Otherwise, the coefficient of friction will be changed on account of the abraded dust remaining in these mechanisms and as a consequence, the characteristics illustrated in FIG. 5 will deteriorate, thereby accelerating the wear.

In the above-mentioned device, the damping and torque limiting mechanism 15 is located inside of the spring mechanism 12. Therefore, the abraded dust generated in the mechanism 15 will be discharged through the clearance 11 via the mechanism 12. On the other hand, the abraded dust of the lining 19a generated through sliding friction between the lining 19a of the hysteresis mechanism 18 and the driven plate 6b will be discharged into the bolt hole 23. Thus, there is no likelihood that the abraded dust remains on the sliding friction surface and affects the coefficient of friction or promotes the wear.

In the prior device which does not permit the bolt hole 23 to extend to the sliding friction surface, the bolt hole 23 has a bottom wall left and accordingly the driven plate becomes thick. In the case of the present invention which permits the bolt hole 23 to penetrate the driven plate 6b, the driven plate 6b can be fabricated thin and accordingly the axial dimension of the device can be reduced.

Meanwhile, for stability of the characteristics illustrated in FIG. 5, the sliding friction characteristic of the device, particularly that of the hysteresis mechanism 18 must be stabilized. In the present invention in which the frictional member 19a of the hystersis 18 is mainly composed of polyimide resin, a high coefficient of friction, a good absorption of torque variation, a good anti-wear property and a high durability can be attained and accordingly the change in the coefficient of friction at an advanced stage of wear is minor, thereby ensuring a stable performance of the device.

For the sake of the characteristic stability as described above, it is not desirable that the spring seat 14 of the spring mechanism 12 gets heavily worn and the performance of the spring mechanism 12 deteriorates. According to the present invention, the part, which contacts the driven disk 16, of the spring seat 14, i.e., the part subject to a particularly heavy wear, is designed to form an approximately elliptical recess 14b with an increased area of contact with the projection 16c of the driven disk, with the result that the plane pressure due to a centrifugal force of rotation is reduced and accordingly the wear can be reduced. And this is done without increasing the axial dimension or decreasing the strength of the driven disk.

Meanwhile, a closer location of the center $R_2$ of the recess 14b than the center $R_1$ of the projection 14a to the opposite spring seat allows the coil spring 13 to be made longer, allows a play against the driven disk 16 to be made larger, and as a consequence allows the relative angular displacement between the driving side and the driven side to be made larger, thereby reducing the natural frequency of resonance of the device and enhancing the effect of vibration absorption.

Meanwhile, a rib 14c provided on both sides of the recess 14b inhibits axial displacement and therefore the driven disk 16 is not likely to be axially dislocated against the spring seat 14. The rib 14c concurrently serves to reinforce the spring seat 14.

As understood from the above, in the present invention in which the bolt hole for the bolt to fasten together the flywheel body and the driven plate extends to the position of the hysteresis mechanism, the abraded dust of the lining generated through sliding friction between the hysteresis mechanism and the flywheel can be collected in the bolt hole, and this brings about such benefits as suppression of a change in the coefficient of friction, prevention of wear progress, and reduction of axial dimension of the device.

Other benefits derived from the present invention come from fabrication of the frictional member of the hysteresis mechanism mainly with polyimide resin and they include an enhanced effect of vibration absorbing on account of a high coefficient of friction, an increased durability on account of good anti-wear property and a stabilized performance on account of a small change in the coefficient of friction.

Still other benefits originating from provision of a recess on the driving side of the spring seat and provision of a projection on the driven side include mitigation of wear of the spring seat on account of an increased area of contact, an increased effect of vibration absorption on account of an increase in the length and play of the spring, prevention of dislocation of spring seat from driven plate, and maintenance of spring seat strength when a rib is formed between the projection and the recess of the spring sea.

Although only several preferred embodiments of the present invention have been described in detail, it will be appreciated by those skilled in the art that various modifications and alterations can be made of the preferred embodiments shown without materially departing from the novel teachings and advantages of this invention. Accordingly, it is to be understood that all such modifications and alterations are included within the scope of the invention as defined by the following claims.

What we claim is:

1. A torque variation absorbing device comprising:
   a driving plate coupled to a driving shaft, said driving plate includes ring-shaped outer and inner bodies, a pair of steel side plates, the outer body being clamped by the pair of steel side plates and being connected to the pair of steel side plates, and the inner body being connected to one of the pair of steel side plates;
   a flywheel arranged coaxial with said driving plate and rotatably supported via a bearing on said driving plate, said flywheel being divided into a flywheel body and a driven plate;
   a spring mechanism, a damping and torque limiting mechanism and a hysteresis mechanism interposed between said driving plate and said flywheel; and
   a bolt hole provided in said driven plate to hold a bolt which fastens together the flywheel body and the driven plate, said bolt hole extending through the driven plate up to a sliding friction plane between said hysteresis mechanism and said driven plate.

2. The torque variation absorbing device of claim 1, wherein said flywheel body and said driven plate house said damping and torque limiting mechanism.

3. The torque variation absorbing device of claim 2, wherein the damping and torque limiting mechanism comprises a pair of driven disks and a cone spring which is interposed between the driven disks and presses said pair of driven disks against the flywheel body and the driven plate.

4. The torque variation absorbing device of claim 3, wherein surfaces of said pair of driven disks which contact the flywheel body and the driven plate are provided with abrasive material.

5. The torque variation absorbing device of claim 1, wherein said spring mechanism comprises a coil spring extending in the circumferential direction of said driving plate and said flywheel and spring seats provided at both ends of said coil spring, said spring seats being identical in shape and having a greater spring constant than that of said coil spring.

6. The torque variation absorbing device of claim 5, wherein one of said spring seats is opposed to a radially inward projection of a ring-shaped outer body of said driving plate, while another of said spring seats is opposed to a radially outward projection of a driven disk of the damping and torque limiting mechanism, and in the absence of torque, a gap exists between at least one of said spring seats and the projection to which said at least one of said spring seat is opposed.

7. The torque variation absorbing device of claim 1, wherein said hysteresis mechanism includes a hysteresis plate having a lining of abrasive material and a bent portion, the bent portion being fitted into a hole in one of the side plates of said driving plate, thereby fixing said hysteresis plate circumferentially to said driving plate, and a cone spring interposed between said hysteresis plate and said one side plate, thereby pressing said lining of said hysteresis plate against said flywheel.

8. The torque variation absorbing device of claim 7, wherein the lining provided on the hysteresis plate of said hysteresis mechanism is made of abrasive material mainly containing polyimide resin.

9. The torque variation absorbing device of claim 1, wherein when said bolt is screwed into said bolt hole bored in said driven plate, a space for collecting dust is left between the bolt end and the sliding friction surface of said hysteresis mechanism.

10. The torque variation absorbing device of claim 9, wherein said bolt hole is female-screwed between the end of the bolt screwed into said bolt hole and the sliding friction surface of said hysteresis mechanism.

11. The torque variation absorbing device of claim 9, wherein said bolt hole is not female screwed between the end of the bolt screwed into said bolt hole and the sliding friction surface of said hysteresis mechanism.

12. The torque variation absorbing device of claim 1, wherein said hysteresis mechanism includes a hysteresis plate having a lining of abrasive material, said lining mainly containing polyimide resin, and a core spring interposed between said hysteresis plate and said one side plate, thereby pressing said lining of said hysteresis plate against said flywheel.

13. A torque variation absorbing device comprising:
a driving plate coupled to a driving shaft;
a flywheel arranged coaxial with said driving plate and rotatably supported via a bearing on said driving plate, said flywheel being divided into a flywheel body and a driven plate;
a spring mechanism, a damping and torque limiting mechanism and a hysteresis mechanism interposed between said driving plate and said flywheel, said spring mechanism including a coil spring extending in the circumferential direction of said driving plate and said flywheel, and spring seats provided at both ends of said coil spring, said spring seats being identical in shape and having a greater spring constant than that of said coil spring, and the part of the spring seat which is opposed to the driving plate has a projection formed thereon, while the part of the spring seat which is opposed to the driven disks of the damping and torque limiting mechanism has a recess formed thereon; and
a bolt hole provided in said driven plate to hold a bolt which fastens together the flywheel and the driven plate, said bolt hole extending through the driven plate up to a sliding friction plane between said hysteresis mechanism and said driven plate.

14. The torque variation absorbing device of claim 13, wherein a center of said recess in the spring seat at one end of said coil spring is located closer to another spring seat at the other end of said coil spring than a center of said projection in the spring seat at said one end of said coil spring.

15. The torque variation absorbing device of claim 13, wherein a rib is formed between said projection and said recess in said spring seat.

16. The torque variation absorbing device of claim 13, wherein said projection is formed at a part of said spring seat which is located approximately at a coil diameter of said coil spring and said recess is formed at a part of said spring seat which is located inside of the coil diameter of said coil spring.

* * * * *